(12) United States Patent
Kulmala et al.

(10) Patent No.: US 8,774,047 B2
(45) Date of Patent: Jul. 8, 2014

(54) METHOD FOR PROVIDING VIRTUAL PRIVATE NETWORK SERVICES BETWEEN AUTONOMOUS SYSTEMS

(75) Inventors: Marko Kulmala, Espoo (FI); Ville Hallivuori, Espoo (FI); Jyrki Soini, Helsinki (FI)

(73) Assignee: Teliasonera AB (SE)

( * ) Notice: Subject to any disclaimer, the term of this patent is extended or adjusted under 35 U.S.C. 154(b) by 759 days.

(21) Appl. No.: 11/884,253

(22) PCT Filed: Feb. 13, 2006

(86) PCT No.: PCT/FI2006/050060
§ 371 (c)(1),
(2), (4) Date: Sep. 4, 2007

(87) PCT Pub. No.: WO2006/084956
PCT Pub. Date: Aug. 17, 2006

(65) Prior Publication Data
US 2008/0267187 A1    Oct. 30, 2008

(30) Foreign Application Priority Data
Feb. 14, 2005  (FI) .................................... 20055066

(51) Int. Cl.
*H04L 12/28*    (2006.01)
(52) U.S. Cl.
USPC ..................... 370/254; 370/395.31; 370/401
(58) Field of Classification Search
None
See application file for complete search history.

(56) References Cited

U.S. PATENT DOCUMENTS

| | | | | |
|---|---|---|---|---|
| 7,733,876 | B2 * | 6/2010 | Davie et al. ............... | 370/395.53 |
| 2004/0028064 | A1 * | 2/2004 | Cetin et al. .................... | 370/409 |
| 2005/0008015 | A1 * | 1/2005 | Meda ............................. | 370/392 |
| 2005/0188106 | A1 * | 8/2005 | Pirbhai et al. ................. | 709/238 |
| 2006/0133265 | A1 * | 6/2006 | Lee ................................ | 370/228 |

FOREIGN PATENT DOCUMENTS

EP           1 388 980           2/2004

OTHER PUBLICATIONS

Rosen E C: "BGP/IMPLS IP VPNs RFC2547bis" Internet Article, Oct. 31, 2004, pp. 1-43, XP008120854.

* cited by examiner

*Primary Examiner* — Gregory Sefcheck
*Assistant Examiner* — Daniel Mitchell
(74) *Attorney, Agent, or Firm* — Cozen O'Connor (57) ABSTRACT

The present invention relates to providing virtual private network (VPN) services between two or more Autonomic Systems (AS). An aggregation edge router (ASBR) is provided in two or more autonomous systems (Asx,Asy). The aggregation edge routers are configured such that routing peering between the two or more autonomous systems is done between the aggregation edge routers in these autonomous systems. Each aggregation edge router is a routing peer of other edge routers (PE) in its own autonomous system. The Multi-Protocol Label Switching (MPLS) network is used between the different autonomous systems.

14 Claims, 4 Drawing Sheets

METHOD FOR PROVIDING VIRTUAL PRIVATE NETWORK SERVICES BETWEEN AUTONOMOUS SYSTEMS

PRIORITY CLAIM

This is a U.S. national stage of application No. PCT/FI2006/050060, filed on 13 Feb. 2006. Priority is claimed on the following application(s): Country: Finland, Application No.: 20055066, Filed: 14 Feb. 2005, the content of which is/are incorporated here by reference.

BACKGROUND OF THE INVENTION

The present invention relates to virtual private network (VPN) services, and particularly to providing VPN services between two or more Autonomous Systems (AS).

Virtual Private Networks (VPN) are commonly used for connecting trusted parties or "sites" to each other over an untrusted (public) backbone network through a secure tunnel. Two sites have IP connectivity over the common backbone only if there is some VPN which contains them both. Two sites which have no VPN in common have no connectivity over that backbone. If all the sites in a VPN are owned by the same enterprise, the VPN may be thought of as a corporate "intranet". If the various sites in a VPN are owned by different enterprises, the VPN may be thought of as an "extranet". A site can be in more than one VPN; e.g., in an intranet and in several extranets. In general, when we use the term VPN, we will not be distinguishing between intranets and extranets. The owners of the sites are often referred to as the "customers". The owners/operators of the backbone are often referred to as the "Service Providers" (SPs). The customers obtain "VPN service" from the SPs. A customer may be a single enterprise, a set of enterprises, an Internet Service Provider, an Application Service Provider, another SP which offers the same kind of VPN service to its own customers, etc.

Security and management considerations may render it advantageous to subdivide a large network into several network parts that need to know as little as possible of each other. This is especially important in the case where these network parts are managed by different service providers. These network parts are often referred to as Autonomous Systems (AS). The Autonomous System corresponds to an administrative domain, such as university, company, backbone network, etc.

The Internet Engineering Task Force (IETF) has defined a concept which allows Service Providers to offer Virtual Private Network ("VPN") services to their customers. Each VPN site must contain one or more Customer Edge (CE) routers. Each CE router is attached, via some sort of attachment circuit, to one or more Provider Edge (PE) routers. CE routers are logically part of the customer's VPN, and PE and P routers are logically part of the SP's network. The attachment circuit over which a packet travels when going from CE to PE is known as that packet's "ingress attachment circuit", and the PE as the packet's "ingress PE". The attachment circuit over which a packet travels when going from PE to CE is known as that packet's "egress attachment circuit", and the PE as the packet's "egress PE". We will say that a PE router is attached to a particular VPN if it is attached to a CE router which is in a site of that VPN. Similarly, we will say that a PE router is attached to a particular site if it is attached to a CE router which is in that site. When the CE router is a router, it is a routing peer of the PE(s) to which it is attached, but it is not a routing peer of CE routers at other sites. Routers at different sites do not directly exchange routing information with each other; in fact, they do not even need to know of each other at all. As a consequence, the customer has no backbone or "virtual backbone" to manage, and does not have to deal with any inter-site routing issues. Each PE router maintains a number of separate forwarding tables, including VPN Routing and Forwarding tables (VRFs). Every PE-CE attachment circuit is associated, by configuration, with one or more VRFs. An attachment circuit which is associated with a VRF is known as a "VRF attachment circuit". In the simplest and most typical case, a PE-CE attachment circuit is associated with exactly one VRF. When an IP packet is received over a particular attachment circuit, its destination IP address is looked up in the associated VRF. The result of that lookup determines how to route the packet. The VRF used by the packet's ingress PE for routing a particular packet is known as the packet's "ingress VRF". The packet's "egress VRF", is located at the packet's egress PE.

An Autonomous System AS has an Autonomous System Border Router for connections to other Autonomous System (s). The Border Gateway Protocol ("BGP") is used to distribute the customers routes across the provider's IP (Internet Protocol) backbone network, and Multiprotocol Label Switching ("MPLS") is used to tunnel customer packets across the provider's backbone. This is known as a "BGP/MPLS IP VPN". More specifically, if two sites of a VPN attach to PEs which are in the same Autonomous System, the PEs can distribute VPN-IPv4 routes to each other by means of an IBGP connection between them. The term "IBGP" refers to the set of protocols and procedures used when there is a BGP connection between two BGP speakers in the same Autonomous System. This is distinguished from "EBGP", the set of procedures used between two BGP speakers in different Autonomous. Systems. Alternatively, each can have an IBGP connection to a route reflector [BGP-RR]. MP-iBGP is employed between two routers within the same AS, and MP-eBGP is used between routers in different AS systems, as will be described below with reference to FIG. 3.

RFC2547bis (draft-ietf-l3vpn-rfc2547bis-03.txt, Internet Engineering Task Force (IETF): BGP/MPLS IP VPNS), especially Chapter 10, defines different ways for providing IP VPN service in a situation wherein the customer sites are attached to provider edge routers PE belonging to different Autonomic Systems (AS) managed by different service providers.

Figure 1:
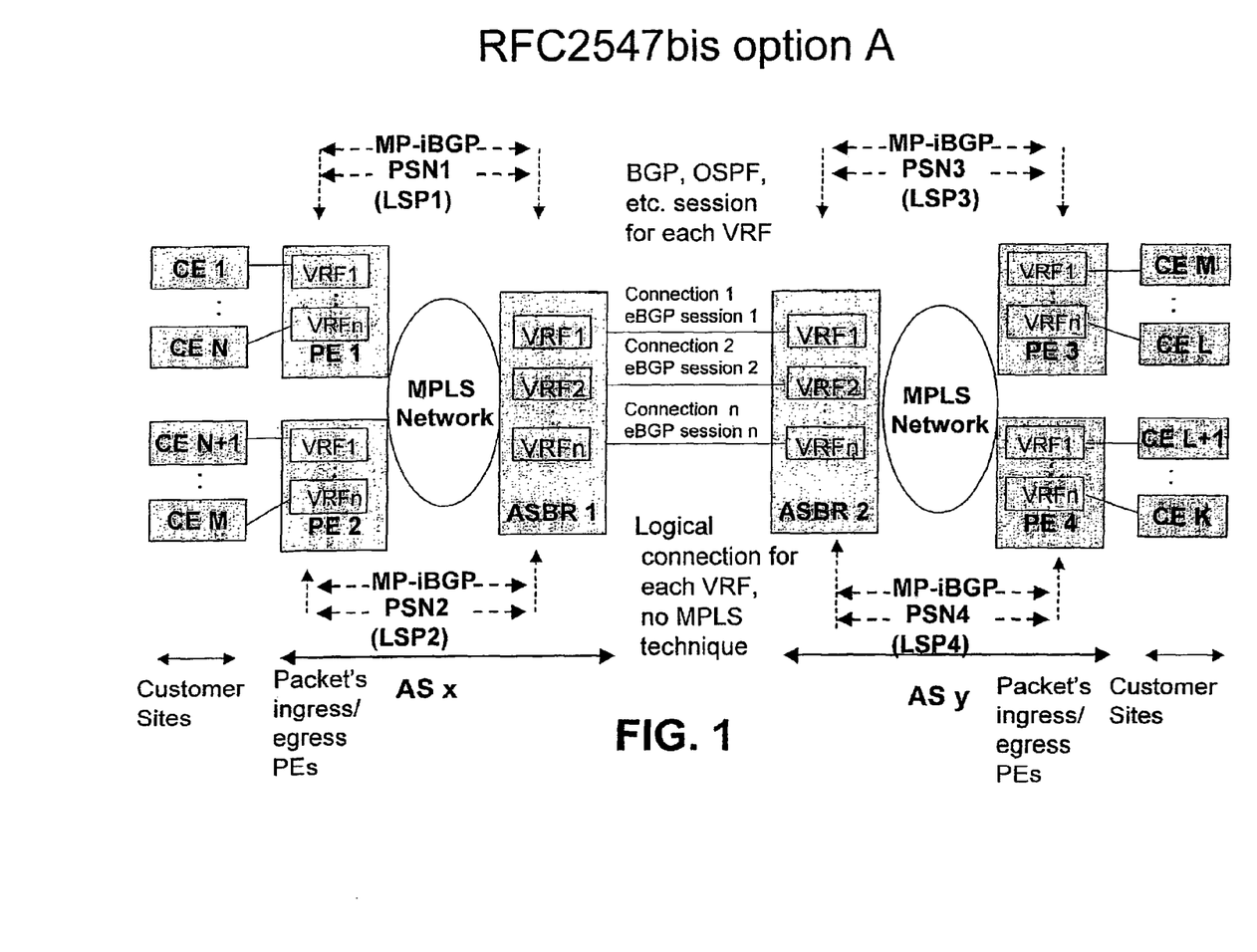
FIG. 1 shows a system diagram illustrating the first inter-AS option (a) defined by RFC2547bis.

FIG. 1 illustrates the first inter-AS option (a) defined by RFC2547bis. In the example shown, provider edge routers PE1 . . . 4 are the ingress/egress PEs of a packet. CE routers are typically located at the customer's facilities. PE has a logical attachment circuit leading to a CE router and associated with the VPN Routing and Forwarding table (VRF) which implements the virtual network of the respective customer. In the inter-AS (a), the Autonomous System Border Routers ASBR are directly interconnected (i.e., there is no Label Switched Path LSP or Multiprotocol Label Switching MPLS network between thereof). VRFs are distinguished from each other by means of a physical or logical connection between the ASBR routers so that the VRFs implementing the same VPN are associated with each other using a different physical connection or subconnection (logical connection). In the example shown FIG. 1, VRF1 in the ASBR1 and VRF1 in the ASBR2 are associated with each other. The routing of the VPN routes for this option (a) is as follows. Let us consider the case where a router CE1 at the customer's site advertises the IP network '10.0.0.0/24' to the edge router PE1 by means of an eBGP session. The router PE1 installs the network '10.0.0.0/24' to an appropriate VRF (e.g. VRF1) and thereafter advertises the network '10.0.0.0/24' further to other PE routers (such as PE2, ASBR1) within the MPLS network of the same Autonomic System AS by means of the MP-iBGB protocol. As a result, also ASBR1 receives the advertisement and installs the route to a VRF. The ASBR1 then advertises the route as a normal IPv4 route to the ASBR2 by means of the eBGP protocol. The ASBR2 advertises the route to other PE routers (e.g. PE3,PE4) within its own Autonomic System AS by means of the MP-IBGP protocol, the other PE routers then advertising the route as a normal IPv4 route to the CE routers.

A problem in this option (a) is that the MPLS technique cannot be used between the ASBR routers but the use of logical or physical connection is required in the manner described above. Routing of the VPN routes requires one session per each VPN, which can also prevent scalability to a large number of VPNs.

Figure 2:
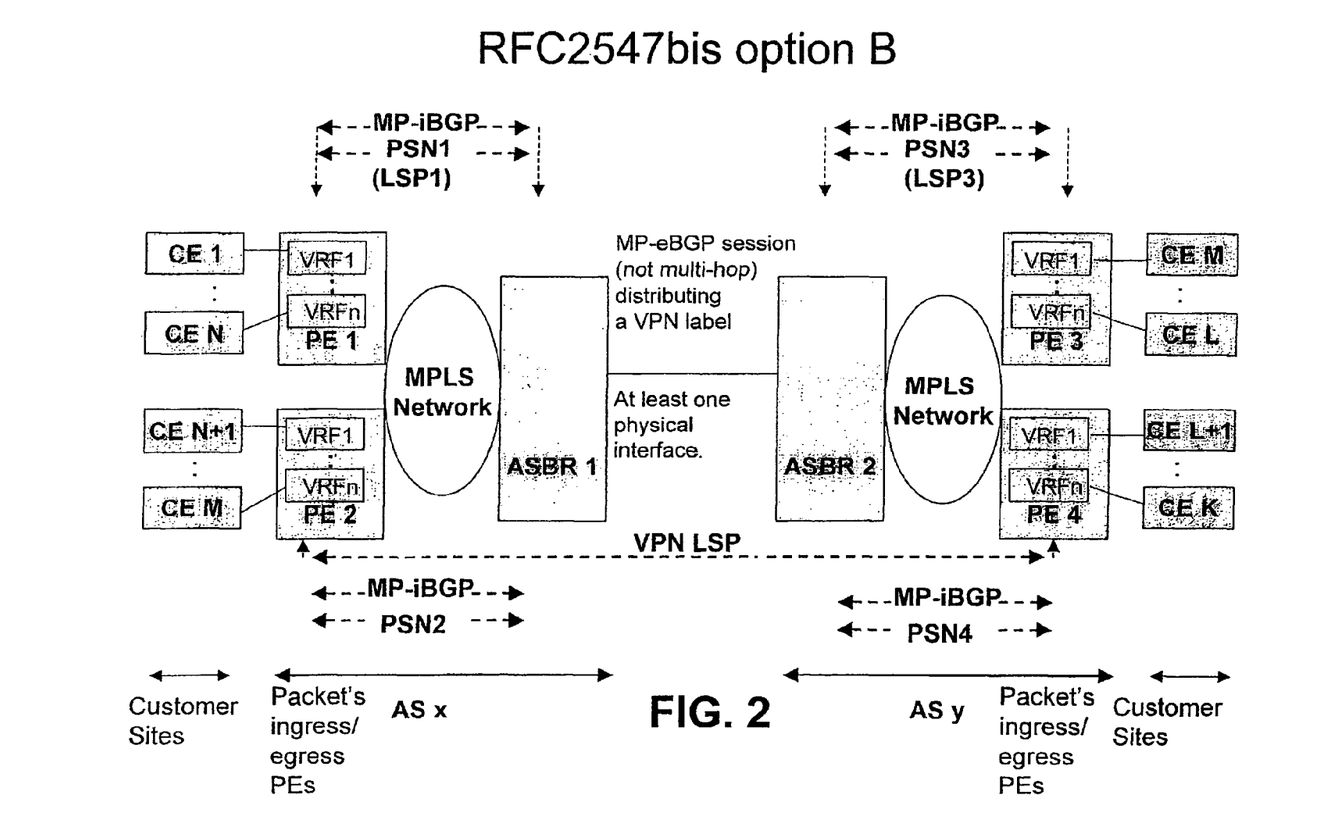
FIG. 2 shows a system diagram illustrating the second inter-AS option (b) defined by RFC2547bis.

FIG. 2 illustrates the second inter-AS option (b) defined by RFC2547bis. In this option, no actual VRFs are maintained in the ASBR routers. The ASBR routers have to maintain the VPN routes but they are not installed to VRFs. VPN route information, which also contains a label (VPN label) used for the respective route, is distributed using the MP-eGBP protocol. Typically the ASBR router rewrites the next hop attribute in the BGP message to address the ASBR router itself. Thus, the packet transferred between ASBR routers is labelled with a VPN label but contains no Packet Switched Network (PSN) label, due to which there can be no MPLS network with a PSN tunnel between the ASBR routers. This would be needed if more than two ASBR routers were interconnected to each other, or if the ASBR routers were remote from each other and MPLS technique were employed in the switching layer. Otherwise, the routing of the VPN route is similar to that of the option (a), expect that the a single MP-eBGP session is used between the ASBR routers to distribute the VPN-IPv4 addresses, and several eBGP sessions are not required for that purpose.

A problem in this option (b) is that a label switched path is needed between the ingress and the egress PEs, because the ASBR routers will not terminate the label switched path to a VRF instance. In this case, a label switched path is formed with VPN labels which are distributed by means of the MP-BGP protocol. As routes are not installed in a VRF, the service providers must take care of filtering of RT attributes for security reasons. The option (b) does not require use of subconnections to associate VRFs between the ASBR routers, which is an advantage over the option (a).

Figure 3:
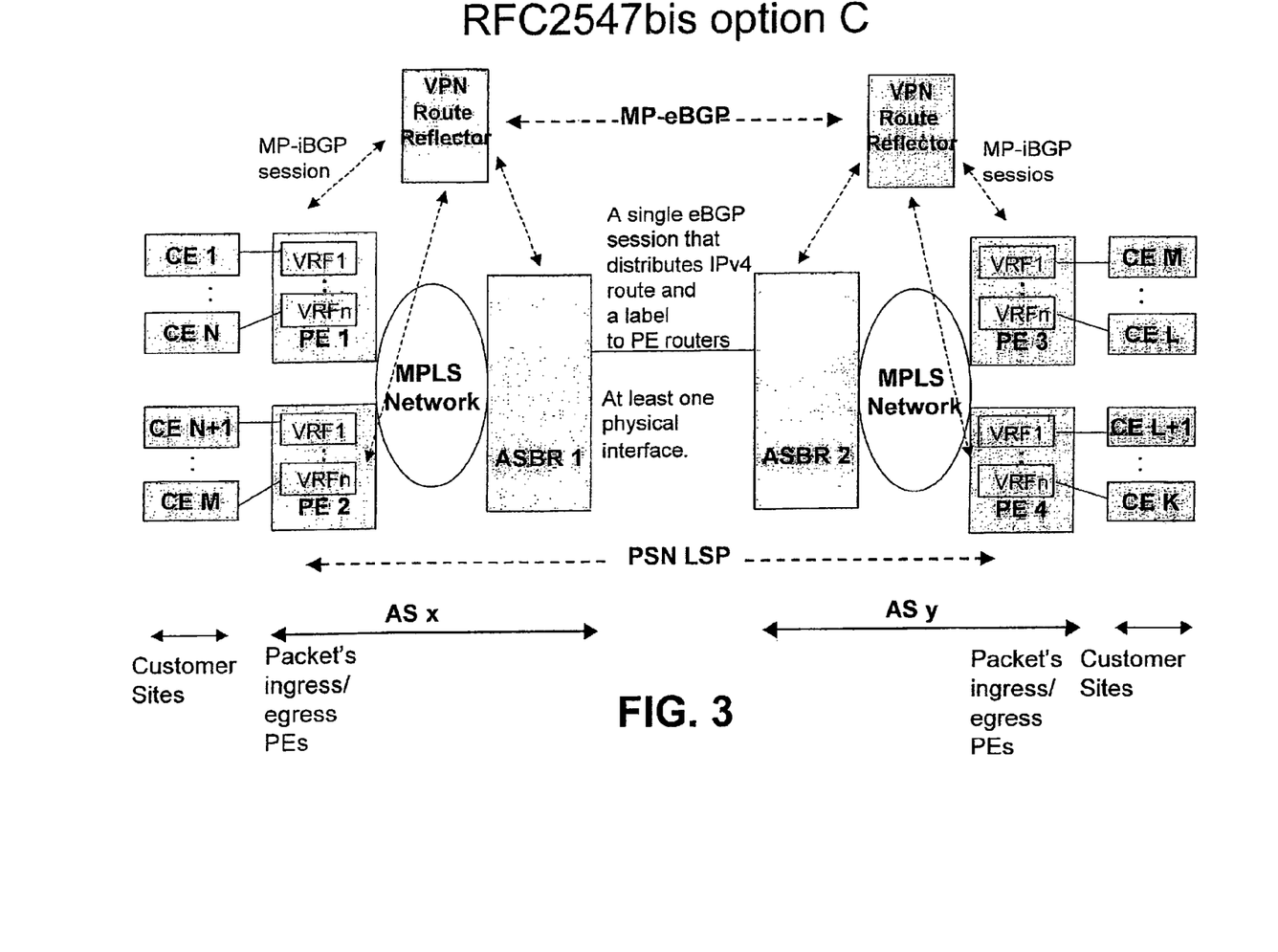
FIG. 3 shows a system diagram illustrating the third inter-AS option (c) defined by RFC2547bis.

FIG. 3 illustrates the third inter-AS option (c) defined by RFC2547bis. In this option, the eBGP protocol is used between the ASBR routers to advertise an IPv4 address of the ingress edge routers (PE1 . . . PE4 in the example shown in FIG. 3) and a corresponding label to other Autonomous Systems AS. This way, a label switched path is provided between the ingress and the egress PEs of the packet. In this case, there is a PSN tunnel within which the VPN labels are transferred. VPN-IPv4 routes and VPN labels are typically distributed by means of a VPN Route Reflector. Each PE router (e.g. PE1, PE2,ASBR1, or PE3,PE4, ASBR2) in the same Autonomic System AS has an MP-iBGP session to a VPN Route Reflector of the specific AS. VPN Route Reflectors of different ASs exchange the VPN-IPv4 using the MP-eBGP protocol. However, label switched paths between several edge routers of different service providers pose a security risk. An advantage of the option (c) is that the ASBR router does not need to maintain VPN routes.

SUMMARY OF THE INVENTION

An object of the present invention is to provide a new method for providing VPN services between autonomic systems.

According to the present invention, an aggregation edge router is provided in two or more different autonomously managed network parts, referred to as autonomous systems herein. The aggregation edge routers are configured such that routing peering between the two or more autonomous systems is done between the aggregation edge routers in these autonomous systems. Each aggregation edge router is a routing peer of other edge routers in its own autonomous system. Thus, the other edge routers in the autonomous system must know reachability information, such as a label switched route, only to the aggregation edge router in the same autonomic system. An ingress edge router in one autonomous system does not need to know reachability information on the egress edge router in another automatic system. Also an aggregation edge router in one autonomous system must only be able to make contact with a peer aggregation edge router in another autonomous system. By the merits of the present invention, the scalability and security of the network are improved, The invention also allows the use of a Multiprotocol Label Switching MPLS network between the different autonomous systems. Thus, a separate logical or physical connection is not needed for each VRF in the ASBR as in one of the prior art approaches.

In an embodiment of the invention, the aggregation edge router acts as an Autonomous System Border Router (ASBR).

In an embodiment of the invention, a Multiprotocol internal Border Gateway Protocol (MP-iBGP) is employed between the aggregation edge router and other edge routers in the same autonomous system for distributing Internet Protocol-Virtual Private Network (IP-VPN) routes.

In an embodiment of the invention, a Multiprotocol external Border Gateway Protocol (MP-eBGP) is employed between aggregation edge routers in different autonomous systems for distributing IP-VPN routes.

In an embodiment of the invention, when receiving IP-VPN routes from other edge routers in the same autonomous system, the aggregation edge router may import the IP-VPN routes into one or more appropriate VPN Routing and Forwarding tables (VRF). Before the IP-VPN routes are redistributed to a peer aggregation edge router in another autonomous system, the aggregation edge router may further replace associated route distinguisher (RD) and route target (RT) attributes of the route by those configured to the corresponding VRF or VRFs in the aggregation edge router and set the next hop to itself, e.g. by replacing the next hop attribute of the route by an IP address of the aggregation edge router.

In an embodiment of the invention, when receiving IP-VPN routes from an aggregation edge router in another autonomous system, the aggregation edge router may import the IP-VPN routes into one or more appropriate VPN Routing and Forwarding tables (VRF). Before re-advertising the IP-VPN routes to other edge routers in its own autonomous system, the aggregation edge router may further replace associated route distinguisher (RD) and export route target (RT) attributes of the route by those configured to the corresponding VRF or VRFs in the aggregation edge router and set the next hop to itself, e.g. by replacing the next hop attribute of the route by an IP address of the aggregation edge router.

The advantages of replacing the route distinguisher (RD) and route target (RT) attributes include the following ones. When the same route is imported in re-advertising aggregation edge router into multiple VRFs, it can be exported to MP-BGP neighbors from those VRFs with different sets of the export route targets. If the route advertised to MP-BGP neighbors had the same RD, then only those RTs that were along with the best route would take effect in the receiving MP-BGP neighbour. If multiple aggregation edge routers use different route distinguishers, other edge routers can use load balancing if the packet's egress edge router is connected to multiple aggregation edge routers (multi-homing of PE router).

The present invention eliminates the need of reachability information between the packet's ingress and egress routers. The present invention does not require a label switched path between the packet's ingress and egress edge routers. Neither does the present invention require a BGP session between ingress and egress edge routers; not even via a Route Reflector.

BRIEF DESCRIPTION OF DRAWINGS

In the following description, reference is made to the accompanying drawings which form a part hereof, and which illustrate several embodiments of the present invention. In the drawings.

DETAILED DESCRIPTION

The principles of the invention will be described in more detail by means of illustrating examples. In these examples, the aggregation edge router according to the invention is implemented at an Autonomous System Border Router (ASBR) and in a "BGP/MPLS IP VPN" environment substantially meeting the RFC2547bis. Details of the "BGP/MPLS IP VPN" can be obtained from relevant Requests for Comment (RFCs) and Internet-Drafts available at http://www.ietf.org and incorporated herein by reference.

However, before describing the example embodiments of the invention, RT and RD attributes of the "BGP/MPLS IP VPN" are described briefly in order to facilitate description of the examples.

A VPN-IPv4 address is a 12-byte quantity, beginning with an 8-byte "Route Distinguisher (RD)" and ending with a 4-byte IPv4 address. If several VPNs use the same IPv4 address prefix, the Provider Edge routers (PE) trans-late these into unique VPN-IPv4 address prefixes. This ensures that if the same address is used in several different VPNs, it is possible for BGP to carry several completely different routes to that address, one for each VPN. Since VPN-IPv4 addresses and IPv4 addresses are different address families, BGP never treats them as comparable addresses. An RD is simply a number, and it does not contain any inherent information; it does not identify the origin of the route or the set of VPNs to which the route is to be distributed. The purpose of the RD is solely to allow one to create distinct routes to a common IPv4 address prefix. Other means are used to determine where to redistribute the route. The RD can also be used to create multiple different routes to the very same system. The RDs are structured so that every service provider can administer its own "numbering space" (i.e., can make its own assignments of RDs), without conflicting with the RD assignments made by any other service provider. A PE needs to be configured such that routes which lead to a particular Customer Edge (CE) router will become associated with a particular RD. The configuration may cause all routes leading to the same CE to be associated with the same RD, or it may be cause different routes to be associated with different RDs, even if they lead to the same CE.

When a VPN-IPv4 route is created (from an IPv4 route which the PE has learned from a CE) by the PE router, it is associated with one or more Route Target (RT) attributes. These are carried in BGP as attributes of the route. Any route associated with the Route Target RT must be distributed to every PE router that has a VRF associated with the Route Target T. When such a route is received by a PE router, it is eligible to be installed in those of the PE's VRFs which are associated with the Route Target. A Route Target attribute can be thought of as identifying a set of sites, or a set of VRFs. Associating a particular Route Target attribute with a route allows that route to be placed in the VRFs that are used for routing traffic which is received from the corresponding sites. There is a set of Route Targets that a PE router attaches to a route received from site S; these may be called the "Export Targets". There is also a set of Route Targets that a PE router uses to determine whether a route received from another PE router could be placed in the VRF associated with site S; these may be called the "Import Targets". The two sets are distinct, and need not be the same.

Figure 4:
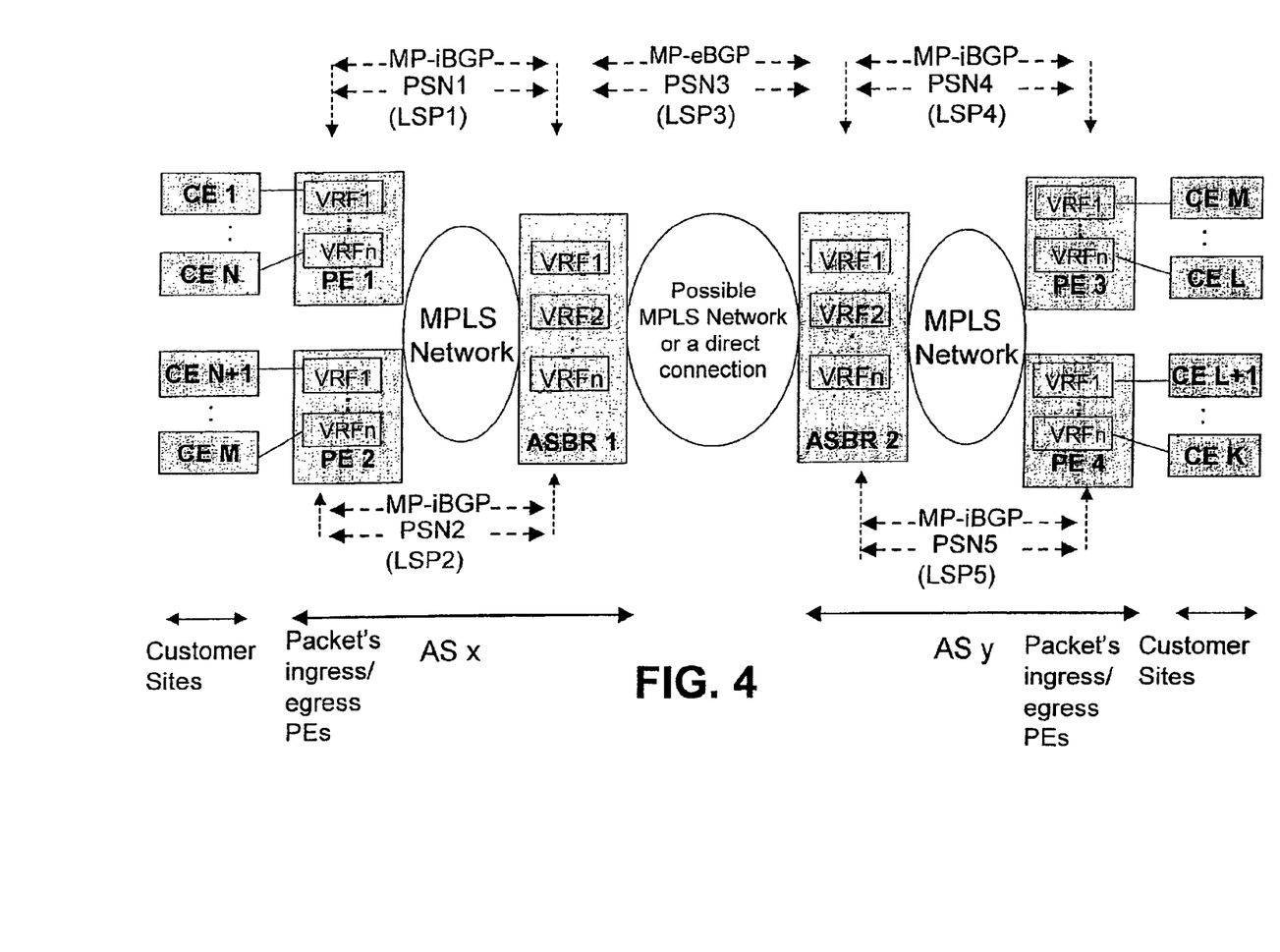
FIG. 4 shows a system diagram illustrating an example arrangement embodying basic principles of the present invention.

FIG. 4 shows an example arrangement embodying basic principles of the present invention. In the embodiment illustrated in FIG. 4, Provider Edge routers PE1 . . . 4 are the packet's ingress/egress edge routers. Customer Edge (CE) routers are typically located at the customer's facilities. PE has a logical attachment circuit leading to a CE router and associated with the VPN Routing and Forwarding table (VRF) which implements the virtual network of the respective customer. In this embodiment of the invention, the VPN between VPN sites is implemented substantially in accordance with the RFC2547 specifications but applying the principles of the present invention. In the embodiment of the invention, the ASBR routers (ABRS1 for the Autonomic System ASx, ABRS2 for the Autonomic System ASy) also include VPN Routing and Forwarding tables (VRFs). Packet Switched Network (PSN) tunnels are provided between the packet's ingress/egress edge routers (In the illustrated example PE1, PE2 for the Autonomic System ASx, and PE3, PE4 for the Autonomic System ASy). The PSN tunnels may be implemented in the form of a Label Switched Path (LSP), for example, or by means of GRE, IPinIP or any other suitable technique. The type of the PSN tunnel used is not relevant to the basic invention.

The PSN tunnels PSN1, PSN2, and PSN4, PSN5 (and respective Label switched paths LSP1, LSP2, LSP4, and LSP5) from PE routers at the ABSR of the own system, i.e. routers PE1, PE2 and PE3, PE4 terminate at ABSR1 and ABSR2, respectively. The PSN tunnel PSN3 (and respective Label switched path LSP3) between the Autonomous Systems ASx and ASy terminate at ABSR1 and ABSR2. As a consequence, no label switched PSN end-to-end tunnel is established between the packet's ingress/egress edge routers located in different Autonomic Systems ASx and ASy.

Within the Autonomic System ASx, the only router that must have information on edge routers located within the other Autonomic System ASy is the router ASBR1, and even ASBR1 must only be able to make contact with ASBR2 in the ASy. Further, as the ASBR routers contain VPN Routing and Forwarding tables (VRFs) into which the VPN routes are installed, no VPN labeled path is established either. This is due to that the switching is performed on IP level in the ABSR routers, instead of the MPLS level. When an ABSR router receives an IP-VPN route through the MP-iBGP protocol from the ABRS router's own Autonomic System AS, the ABRS router installs the IP-VPN route to an appropriate VRF. The appropriate VRF can be determined based on a RT attribute in the route advertising by comparing the RT attribute with a RT attribute set to the VRF. This mechanism may be in accordance with the pre-sent RFC2547bis procedure.

In accordance with principles of the present invention, the VPN route installed in the VRF is re-advertised to the other ASBR router by means of MP-eBGP, while the route attributes are rewritten to be in accordance with settings of the advertising ASBR router. In the case a VPN-IPv4 route is installed to more than one VRF, the route is advertised to the other ASBR router from each VRF.

In the illustrated example, the following modifications or changes are made in re-advertised route by the ASBR1 according to the present invention:
   RT attributes of the route are replaced by export RT attributes set for the VRF in the advertising ASBR1 router.
   Next Hop attribute of the mute is replaced by an IP address of the advertising ASBR1 router.
   The RD of the route is replaced by an RD set for the VRF in the advertising ASBR1 router.

When the ASBR2 router receives a BGP message modified as described above, the ASBR2 installs the advertised route (assuming that the RT attributes match and the route is the best route, if there are more than one available) to the ASBR2's own VRF and makes corresponding changes to the route before advertising the mute in its own Autonomic System ASy. More specifically, the ASBR2 makes the following modifications or changes in re-advertised route according to the present invention:
   RT attributes of the route are replaced by export RT attributes set for the VRF in the ASBR2 router.
   Next Hop attribute of the route is replaced by an IP address of the ASBR2 router.
   RD of the route is replaced by an RD set to the VRF in the ASBR2 router.

As a result, the other edge routers in the Autonomic System ASx or ASy must know a label switched route only to another router in the same Autonomic System AS, i.e. to the ASBR1 or ASBR2, respectively. No label switched path is needed between the packet's ingress and egress edge routers, which improves the security and scalability of the network.

The above specification, examples and data provide an enabling description of the making and use of the invention. Since many embodiments of the invention can be made without departing from the spirit and scope of the invention, the invention can vary within the scope and spirit of claims hereinafter appended.

The invention claimed is:

1. A method for providing virtual private network (VPN) services between two or more autonomous systems, comprising
   providing an aggregation edge router in each of said two or more autonomous systems;
   configuring a first aggregation edge router in a first autonomous system to be a routing peer of at least two ingress edge routers of packets, the first autonomous system being an autonomous system of the packets' ingress edge routers, such that first packet switched tunnels are established between the at least two ingress edge routers and the first aggregation edge router;
   configuring the first aggregation edge router to be a routing peer of a second aggregation edge router in a second autonomous system, the second autonomous system being an autonomous system of at least two egress edge routers of the packets, such that a second packet switched tunnel is established between the aggregation edge routers;
   configuring the second aggregation edge router to be a routing peer of the packets' egress edge router in the second autonomous system such that third packet switched tunnels are established between the at least two egress routers and the second aggregation edge router;
   receiving, by the second aggregation edge router, a virtual private network-internet protocol (VPN-IP) route from the first aggregation edge router;
   importing, by the second aggregation edge router, the received VPN-IP route into at least one appropriate VPN Routing and Forwarding table (VRF);
   replacing, by the second aggregation edge router, associated route attributes of the received VPN-IP route by those configured to the at least one appropriate VRF in the second aggregation edge router, the route attributes including a route distinguisher (RD) and a route target (RT) of the VPN-IP route;
   setting, by the second aggregation edge router, a next hop attribute for the address to the second aggregation edge router; and
   re-advertising, by the second aggregation edge router, the received VPN-IP route so modified by the replacing and setting, to the packet's egress edge router;
   wherein no end-to-end tunnel between the ingress edge router and the egress edge router of each of the packets is established for the virtual private network services.

2. The method as claimed in claim 1, further comprising:
   establishing said first, second and third packet switched tunnels as separate label switched tunnels.

3. The method as claimed in claim 1, further comprising:
   using a Multi-Protocol internal Border Gateway Protocol between the packets' ingress edge routers and the first aggregation edge router;
   using a Multi-Protocol external Border Gateway Protocol between the first and second aggregation edge routers; and
   using a Multi-Protocol internal Border Gateway Protocol between the packets' egress edge router and the second aggregation edge router.

4. The method as claimed in claim 1, further comprising:
   receiving, at the first aggregation edge router, a VPN-IP route from one of the packets' ingress edge router in the same autonomous system;
   importing, by the first aggregation edge router, the VPN-IP route into the at least one appropriate VPN Routing and Forwarding table (VRF);
   replacing, by the first aggregation edge router, associated route attributes of the route by those configured to the at least one appropriate VRF in the first aggregation edge router;
   setting, by the first aggregation edge router, a next hop attribute for an address to the first aggregation edge router; and
   redistributing, by the first aggregation edge router, the VPN-IP route so modified to the second peer aggregation edge router in the autonomous system of the one of the packets' egress edge router.

5. The method as claimed in claim 4, wherein the next hop attribute of the VPN-IP route is set to be an IP address of the aggregation edge router.

6. The method as claimed in claim 1, wherein a Multi-Protocol Label Switching network is employed between the first and the second aggregation edge routers.

7. An edge router for providing virtual private network (VPN) services in an autonomous system, wherein said edge router is an aggregation edge router, comprising:
- means for establishing first packet switched tunnels between the aggregation edge router and each of at least two edge routers in an own autonomous system of the aggregation edge router, said first packet switched tunnels terminating at the aggregation edge router and the at least one other edge router;
- means for establishing a second packet switched tunnel between the aggregation edge router and a second aggregation edge router in another autonomous system of the aggregation edge router, said second packet switched tunnel terminating at the aggregation edge router and the second aggregation edge router;
- means for receiving a virtual private network-internet protocol (VPN-IP) route from the second aggregation edge router of the ingress edge router of a packet;
- means for importing the received VPN-IP route into at least one appropriate VPN Routing and Forwarding table (VRF);
- means for replacing associated route attributes of the received VPN-IP route by those configured to the at least one appropriate VRF in the aggregation edge router, the route attributes including a route distinguisher (RD) and a route target (RT) of the VPN-IP route;
- means for setting a next hop attribute for an address to the aggregation edge router; and
- means for re-advertising the received VPN-IP route, so modified by the means for replacing and means for setting, to the packet's egress edge router located in the own autonomous system;
- wherein said first packet switched tunnels, and said second packet-switched tunnel are separate tunnels and no end-to-end tunnel passing via the aggregation edge router is established for the virtual private network services.

8. The router as claimed in claim 7, further comprising:
- means for establishing said first and second packet switched tunnels as separate label switched tunnels.

9. The router as claimed in claim 7, wherein the aggregation edge router is configured to use a Multi-Protocol internal Border Gateway Protocol between the aggregation edge router and the at least two edge routers in the own autonomous system; and
- wherein the aggregation edge router is configured to use a Multi-Protocol external Border Gateway Protocol between the aggregation edge router and second aggregation edge router located in another autonomous system.

10. The router as claimed in claim 7, further comprising:
- means for receiving a VPN-IP route from one of the ingress edge routers of a packet in the own autonomous system; and
- means for redistributing the VPN-IP route, so modified, to the second, aggregation edge router in the autonomous system of the packets' egress edge routers.

11. The router as claimed in claim 7, wherein the next hop attribute of the VPN-IP route is set to be an IP address of the aggregation edge router.

12. The router as claimed in claim 7, wherein a Multi-Protocol Label Switching network is employed between the first and second aggregation edge routers.

13. The router as claimed in claim 7, wherein said aggregation edge router is provided at an Autonomous System Border Router.

14. An autonomous system configured to provide virtual private network services between different autonomous systems, the autonomous system comprising:
- at least two edge routers configured to be one of an ingress edge router of a packet and an egress edge router of the packet;
- a first aggregation edge router provided with reachability information to the edge routers and reachability information to a second aggregation edge router in another autonomous system;
- wherein the edge routers are provided with reachability information only to the first aggregation edge router;
- wherein the edge router and the first aggregation edge router are configured to be routing peers so that tunnels terminating to the first aggregation edge router are established between the edge router and the first aggregation edge router,
- wherein the first aggregation edge router is further configured to be a routing peer with the second aggregation edge router so that a further tunnel terminating to the first aggregation edge router is established between the first aggregation edge router and the second aggregation edge router;
- wherein the second aggregation edge router is further configured to:
  - receive a virtual private network-internet protocol (VPN-IP) route from the first aggregation edge router;
  - import the received VPN-IP route into at least one appropriate VPN Routing and Forwarding table (VRF);
  - replace associated route attributes of the received VPN-IP route by those configured to the at least one appropriate VRF in the second aggregation edge router, the route attributes including a route distinguisher (RD) and a route target (RT) of the VPN-IP route;
  - set a next hop attribute for an address to the second aggregation edge router; and
  - re-advertise the received VPN-IP route so modified by the replacing and setting, to the packet's egress edge router; and
- wherein no end-to-end tunnel passing via said first aggregation edge router to the edge routers is established for the virtual private network services.

* * * * *

UNITED STATES PATENT AND TRADEMARK OFFICE
CERTIFICATE OF CORRECTION

PATENT NO. : 8,774,047 B2  
APPLICATION NO. : 11/884253  
DATED : July 8, 2014  
INVENTOR(S) : Marko Kulmala, Ville Hallivuori and Jyrki Soini It is certified that error appears in the above-identified patent and that said Letters Patent is hereby corrected as shown below:

Title page

At (73) Assignee: Teliasonera AB (SE), add -- Tellabs Oy (FI) --.

Signed and Sealed this
Twenty-eighth Day of June, 2016

Michelle K. Lee
*Director of the United States Patent and Trademark Office*